United States Patent [19]

Claassen

[11] Patent Number: 6,018,473

[45] Date of Patent: Jan. 25, 2000

[54] POWER SUPPLY AND PRINTING MACHINE CONTAINING SAME

[75] Inventor: Franciscus Gerardus Johannes Claassen, Oploo, Netherlands

[73] Assignee: Xerox Corporation, Stamford, Conn.

[21] Appl. No.: 09/318,982

[22] Filed: May 26, 1999

[51] Int. Cl.[7] .............................. H02M 1/12; H02M 5/42; H02M 7/155

[52] U.S. Cl. .............................. 363/128; 363/45; 363/54; 363/85; 363/128; 323/901; 323/908

[58] Field of Search ................................. 323/901, 908; 363/45, 46, 47, 52, 54, 85, 128, 126

[56] References Cited

U.S. PATENT DOCUMENTS

| | | | |
|---|---|---|---|
| 4,954,765 | 9/1990 | Hu | 323/901 |
| 5,343,122 | 8/1994 | Sugimori et al. | 315/307 |
| 5,383,081 | 1/1995 | Nishikawa | 323/908 |
| 5,385,365 | 1/1995 | Lee | 323/908 |
| 5,574,632 | 11/1996 | Pansier | 323/908 |
| 5,619,127 | 4/1997 | Warizaya | 323/275 |
| 5,715,154 | 2/1998 | Rault | 363/89 |
| 5,886,892 | 3/1999 | Radley et al. | 363/126 |

*Primary Examiner*—Peter S. Wong
*Assistant Examiner*—Bao Q. Vu

[57] ABSTRACT

A power supply includes a diode bridge rectifier. The diode bridge rectifier output provides direct current to a primary capacitor. A current-limiting resistor is connected in series with the rectifier output and the primary capacitor. The current-limiting resistor acts to limit inrush current to the primary capacitor when the power supply is turned on. A triac is coupled in parallel with the current-limiting resistor. When charged, the primary capacitor provides a primary signal and primary current to a switched load, which includes a first winding of a transformer and a load switching device. The transformer also has a second winding connected in series with the triac's gate terminal. When the primary signal reaches a satisfactory level, the load switching device switches the load, causing current transients in the first winding. The first winding current transients, in turn, induce current in the second winding and in the triac gate terminal. The triac thus becomes energized and short-circuits the current-limiting resistor. The second winding also provides current to a diode rectifier which, in turn, charges an auxiliary capacitor. When charged, the auxiliary capacitor provides an auxiliary signal and auxiliary current. The auxiliary current and corresponding auxiliary return current also flow through the triac gate terminal, thereby further energizing the triac.

10 Claims, 3 Drawing Sheets

POWER SUPPLY AND PRINTING MACHINE CONTAINING SAME

FIELD OF THE DISCLOSURE

This disclosure pertains generally to power supplies and, in particular, to a power supply arranged to limit inrush current.

BACKGROUND OF THE INVENTION

Switching power supplies are known. As known, such power supplies have an alternating current ("AC") input coupled to the input of a full-wave diode rectifying bridge. The diode bridge converts the AC into direct current, which is then supplied to the diode bridge output. The direct current, in turn, is arranged to charge an output capacitor. When the output capacitor is charged, a direct current output signal is made available from the output capacitor. The output signal, in turn, is time-switched in sequence between several available loads.

Also as known, such power supplies generally switch their loads through load transformers having multiple windings. Typically the load current will be switched through a first winding of a load transformer, with the resulting current transients through the first winding acting to induce current in a second winding of the load transformer. Typically this second winding will be connected in series with a rectifying diode. The output of the diode, in turn, will be arranged to charge an auxiliary output capacitor. When this auxiliary output capacitor is charged, a direct current auxiliary output signal is made available from the auxiliary output capacitor. This auxiliary output is typically used to supply electronic circuits in the primary side of the power supply.

The output capacitor will initially be uncharged when the power supply is initially turned on, that is, when the power supply is initially connected to the AC input. Thus, when the diode bridge begins supplying output voltage to the capacitor, the uncharged capacitor will act to short-circuit the output voltage. As a result of this short-circuit condition presented to the diode bridge, a substantial amount of current will quickly flow, or "inrush", into the charging capacitor. The volume and time duration of this inrush current will vary in direct proportion to the value of the charging output capacitor. Thus, for large capacitors, the resulting inrush current energy can be substantial.

This inrush current is a problem because, at higher levels of current, the safe operating regions of the bridge diodes may be exceeded and, as a result, the diodes may fail. As a result, power supplies usually are equipped with one or more devices to limit the inrush current to safe operating levels.

With respect to this inrush current problem, prior power supplies have included a current-limiting resistor connected in series between the AC input and the diode bridge. With this arrangement, the resistor limited the maximum inrush current that could flow during a power-up condition.

While solving the inrush current problem during power-on, however, this current-limiting resistor has the corresponding negative effect of creating unwanted power loss during normal operation of the power unit. To solve this further problem, prior power supplies used the following arrangement: first, a triac was connected in parallel with the current-limiting resistor and, second, the triac was arranged to become energized during normal operation of the power unit, thus shorting-out the current-limiting resistor to minimize the resistive power loss.

This prior arrangement, however, has the further problem that additional circuitry is required to energize the triac during the normal operation of the power unit. For example, some prior power supplies have used additional transformer windings or additional optical-coupling devices to activate the triac. Such additional components are costly, thus increasing cost to the power supply unit, resulting in a less cost-effective product.

As a result, it is desirable to provide an improved power supply.

SUMMARY OF THE INVENTION

In one aspect of the invention, a power supply includes a diode bridge rectifier. The diode bridge rectifier comprises a primary capacitor. A rectifier output is arranged to provide direct current to the primary capacitor. A current-limiting resistor is connected in series with the rectifier output and the primary capacitor. The current-limiting resistor acts to limit inrush current to the primary capacitor when the power supply is turned on.

In another aspect of the invention, a printing machine includes a power supply. The power supply includes a diode bridge rectifier. The diode bridge rectifier comprises a primary capacitor. A rectifier output is arranged to provide direct current to the primary capacitor. A current-limiting resistor is connected in series with the rectifier output and the primary capacitor. The current-limiting resistor acts to limit inrush current to the primary capacitor when the power supply is turned on.

DESCRIPTION OF THE PREFERRED EMBODIMENTS

Figure 1:
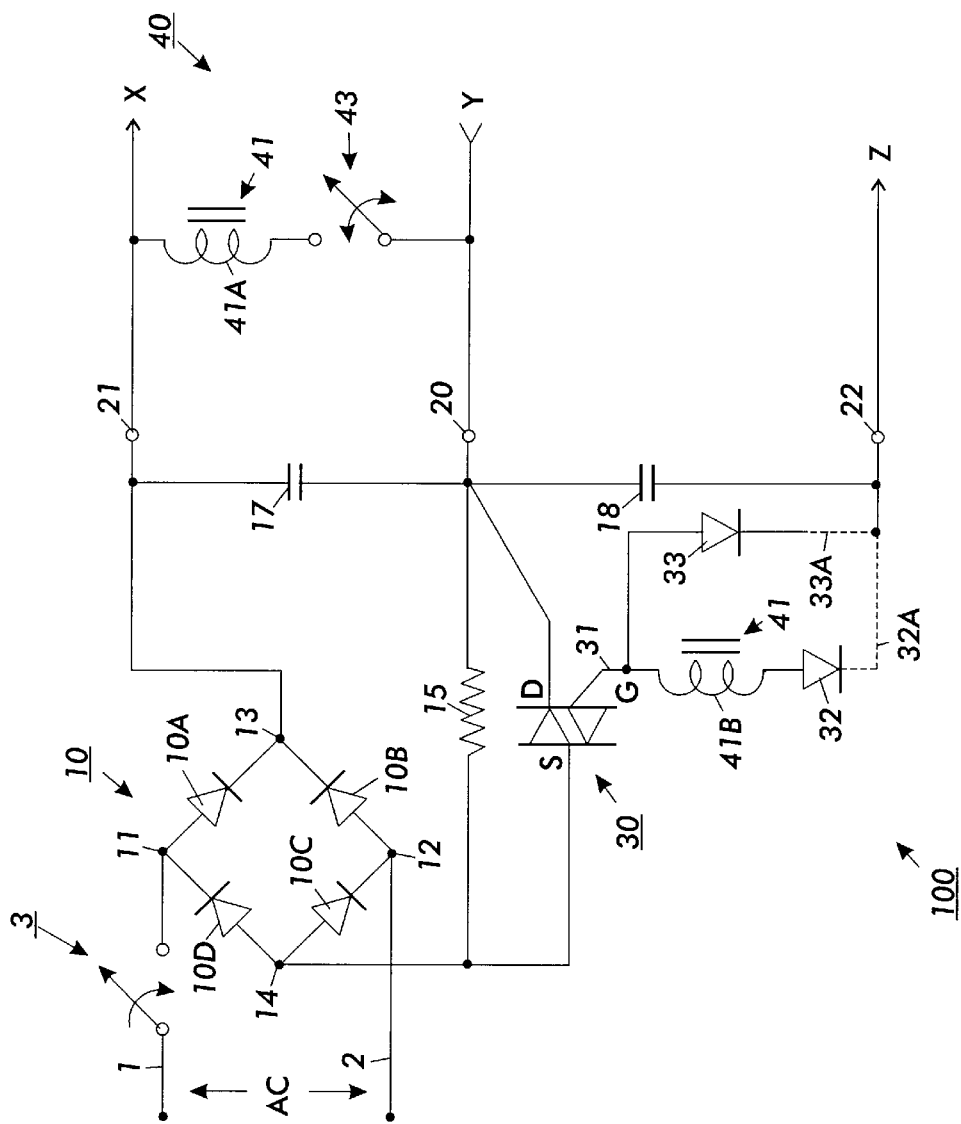
FIG. 1 depicts an input circuit of a power supply arranged to limit inrush current, in accordance with the present invention.

Referring now to FIG. 1, there is shown a power supply input circuit 100 having AC input leads 1, 2 coupled by means of an "on-off" switch 3 to the input terminals 11, 12 of a full-wave diode bridge rectifier 10, the diode bridge rectifier 10 comprising four diodes designated 10A through 10D. As discussed below, the power supply input circuit 100 provides a primary signal (reference letter "X") at terminal 21, an auxiliary signal (reference letter "Z") at terminal 22, and a common return signal (reference letter "Y") at terminal 20.

Figure 2:
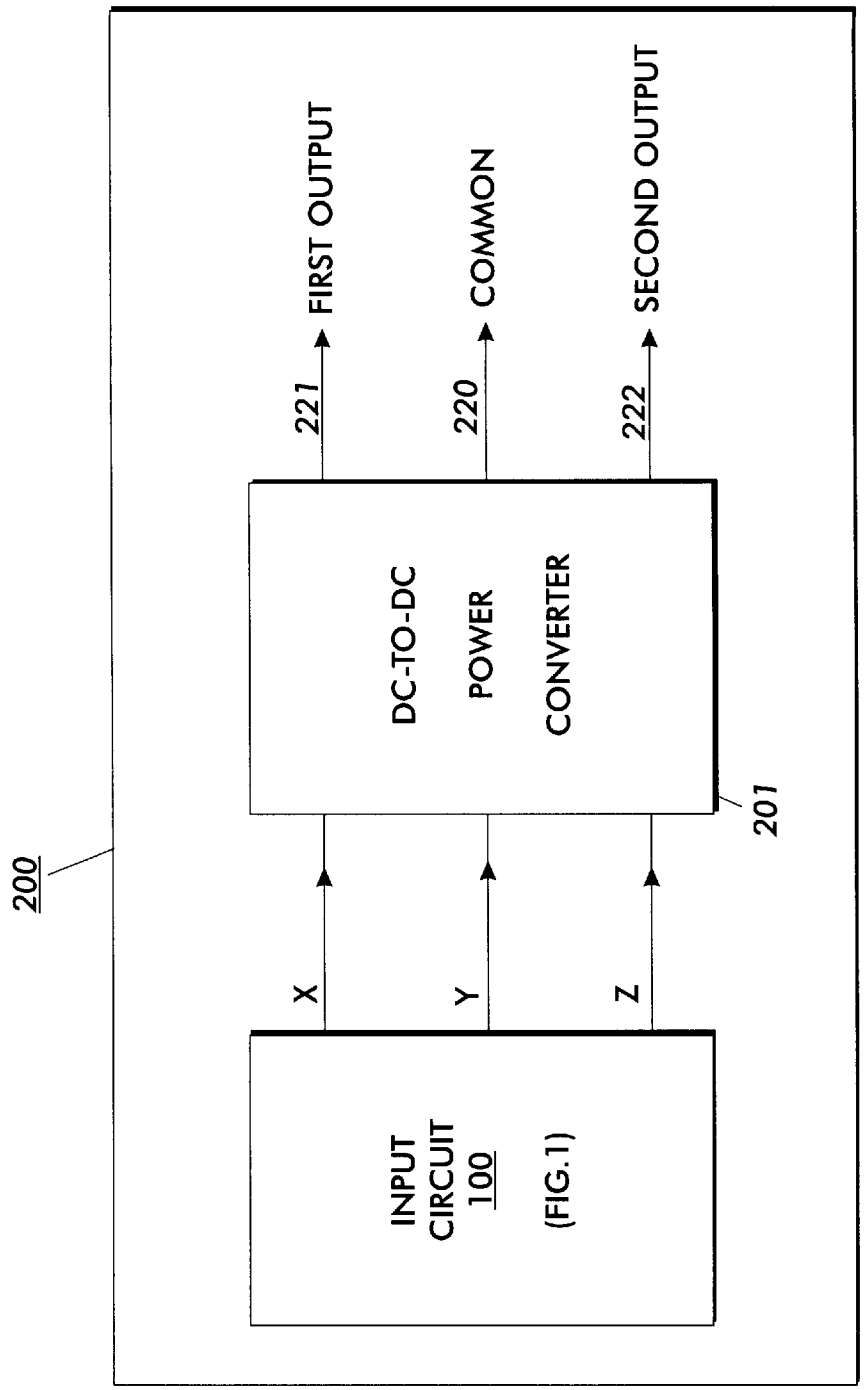
FIG. 2 depicts a power supply arranged to limit inrush current, in accordance with the present invention, the power supply including the FIG. 1 input circuit.

Referring momentarily to FIG. 2, it is seen the signals X, Y, and Z of the FIG. 1 power supply input circuit 100, in turn, supply internal voltage signals for the power supply depicted in FIG. 2.

Returning now to FIG. 1, the AC input circuit typically will include a series-connected fuse, and one or more filtering elements such as, for example, a series-connected inductive coil and one or more parallel-connected capacitors. For ease in understanding the present disclosure, however, these commonly-known elements are not shown in FIG. 1. Also not shown are the well-known power output windings of transformer 41, and the circuits connected thereto.

As a result of AC rectifying by the diode bridge rectifier 10, the rectifier output terminals 13, 14 provide direct current to a primary capacitor 17 by means of a current-limiting resistor 15 connected in series with the rectifier output and the primary capacitor 17. When charged, the primary capacitor 17 provides a primary signal at terminal 21 (X). However, as explained above, upon activating the switch 3, the capacitor 17 will initially be uncharged and, as a result, substantial amounts of inrush current will tend to flow into the capacitor 17. However, as shown, the current-limiting resistor 15 is connected in series between the bridge output 13, 14 and the capacitor 17 and, as a result, the resistor 15 acts to limit inrush current to the capacitor 17 when the power supply input circuit 100 is turned on by activating switch 3.

As shown, the power supply input circuit 100 includes a triac 30 coupled in parallel or shunt with the current-limiting resistor 15. The triac 30 includes a source terminal (labeled "S") coupled to diode bridge output terminal 14, a drain terminal (labeled "D") coupled to the common return terminal 20, and a gate terminal (labeled "G"). As will be more fully explained below, the triac 30 is arranged to short-circuit the resistor 15 when the primary capacitor 17 is charged and the power supply input circuit 100 is fully operational.

When charged, primary capacitor 17 provides a primary signal 21 to a primary load, the primary load being generally designated by reference number 40. The load 40 includes a first winding 41A of a transformer 41 and a load switching device 43. In practice, the load switching device 43 comprises, for example, a switching transistor.

Returning now to the triac 30, it is seen the transformer 40 includes a second winding 41B, the second winding 41 B being connected in series with the gate terminal 31 of the triac 30. As shown, the second winding 41B is also connected to a diode rectifier 32. The diode rectifier 32, in turn, is arranged to charge an auxiliary capacitor 18. As above, when charged, the auxiliary capacitor 18 is arranged to provide an auxiliary signal 22. Those skilled in the art will understand that the diode rectifier 32 may include several commonly-known biasing and filtering elements, intentionally omitted from FIG. 1 as indicated by the broken lines 32A.

Returning again to the triac 30, the gate terminal 31 includes a series connected biasing diode 33. As above, it will be understood that the biasing diode 33 may include other commonly-known biasing and filtering elements, here represented by the broken lines 33A.

The following is a description of the transition of power supply input circuit 100 from an "off" state to an "on" state.

In steady state, with switch 3 is released, AC input current 1, 2 is removed from the power supply input circuit 100, and the power supply input circuit 100 is in the "off" state. In this state, triac 30, load switching device 43, as well as diodes 10A–10D, 32–33 are de-energized or "off", and both the primary capacitor 17 and the auxiliary capacitor 18 are discharged.

In contrast, when the switch 3 is activated, AC input current 1,2 is applied to power supply input circuit 100, and power supply input circuit 100 is set to the "on" state. As the AC current 1, 2 is applied to the diode bridge rectifier 10, the primary capacitor 17 begins to charge. At this point the primary signal 21 is near zero, the load switching device 43 is open-circuited, and so there is no current in the first winding 41A. Because there is no current in the first winding 41A, there is also no current in the second winding 41B, nor in the triac 30 gate terminal 31. As a result, the triac 30 is de-energized and, as a result, the triac 30's source and drain terminals are open-circuited. Moreover, at this point, current inrush to primary capacitor 17 is limited by the presence of the current-limiting resistor 15.

When the primary capacitor 17 becomes charged, load switching device 43 starts operating. When this occurs, load switching device 43 operates to connect the first winding 41A to the common return terminal 20, thus causing current transients in the first winding 41A. These first winding 41A current transients, in turn, induce current in the second winding 41B and in the series-connected gate terminal 31. As a result of the gate terminal 31 current, the triac 30 becomes energized, the triac 30 source and drain terminals thereby effectively short-circuiting the current-limiting resistor 15.

In the steady-state "on" state, the periodic load switching of the switching device 43 results in current transients being periodically generated in the first transformer winding 41A. As a result of the transformer 41 inductive coupling, corresponding current transients are likewise induced in the second transformer winding 41B. These latter current transients 41B, in turn, are rectified by diode 32, thereby charging auxiliary capacitor 18 and ultimately providing an auxiliary signal at terminal 22.

This auxiliary signal 22, in turn, causes an auxiliary current to flow through an auxiliary load (not shown) that is connected between the auxiliary signal 22 and the common return signal 20. It will be appreciated that the is auxiliary current that flows through auxiliary signal terminal 22 also flows through the gate terminal 31 of the triac 30. Likewise, it will be appreciated that the corresponding auxiliary return current that flows through common return signal terminal 20 also flows through the gate terminal 31 of the triac 30. The effect of the auxiliary current and the auxiliary return current through the gate terminal 31 results in triac 30 being maintained in an energized state, with result that the triac's source and drain terminals remain short-circuited across the current-limiting resistor 15.

In one embodiment, in steady state, the primary signal 21 comprises positive 300 volts, and the auxiliary signal 22 comprises positive 15 volts.

Referring now to FIG. 2, there is shown a power supply 200 arranged to limit inrush current, in accordance with the present invention. The FIG. 2 power supply 200 comprises the FIG. 1 power supply input circuit 100 combined with a direct current-to-direct current ("DC-to-DC") power converter 201. The FIG. 1 input circuit 100's primary signal X, common return signal Y, and auxiliary signal Z supply internal voltage signals to the DC-to-DC converter 201 which, in turn, provides a first output signal 221, a common return signal 220, and an second output signal 222.

In one embodiment, for example, the first output signal 221 comprises a 24-volt output, and the second output signal 222 comprises a 5-volt output.

The DC-to-DC converter 201 is common and well-known.

Figure 3:
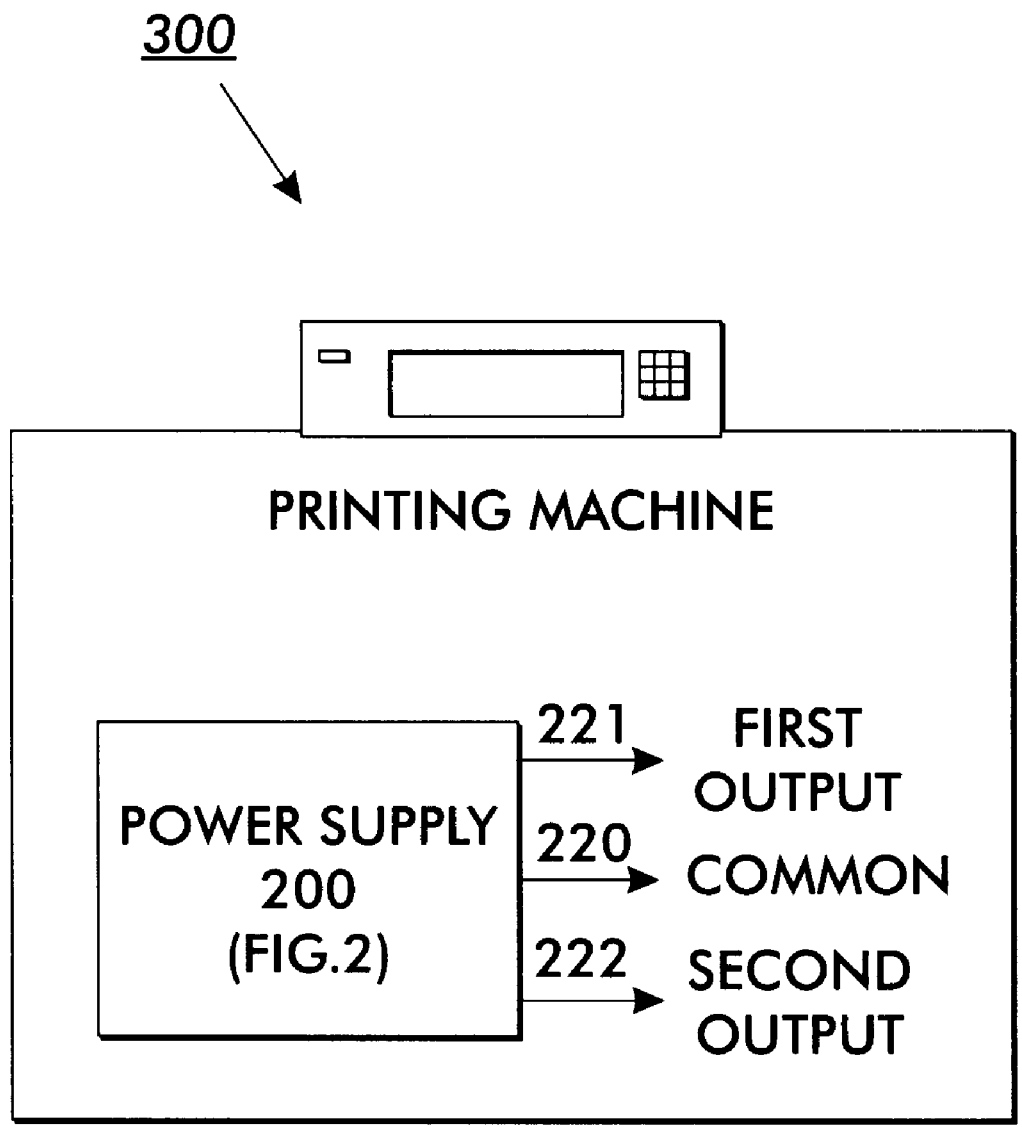
FIG. 3 shows a printing machine arranged with the FIG. 2 power supply.

It will be appreciated that a printing machine may be arranged with a power supply arranged to limit inrush current, in accordance with the present invention. Referring now to FIG. 3, for example, there is shown a block diagram of a printing machine 300 arranged with the power supply 200 of FIG. 2. As explained above, for example, the first output signal 221 may comprise 24 Volts DC, the second output signal 222 may comprise 5 Volts DC, with the signal 220 comprising a common return.

Still referring to FIG. 3, those skilled in the art will appreciate that the first output signal 221 and the second output signal 222 may be used to power any typical printing machine 300 circuits or sub-systems. The above 24-volt DC signal 221, for example, may be used to energize motors, clutches, solenoids, high-voltage power supplies, lamp drivers, laser optical devices, etc. Also, the above 5-volt DC signal 222, for example, may be used to energize electronics for system control, video signal processing, communication, hard disk drives, etc.

In summary, there has been disclosed a power supply 200 with a diode bridge rectifier 10. The diode bridge rectifier output 13, 14 provides direct current to a primary capacitor 17. A current-limiting resistor 15 is connected in series with the rectifier output and the primary capacitor 17. The current-limiting resistor 15 acts to limit inrush current to the primary capacitor 17 when the power supply is turned on. A triac 30 is coupled in parallel with the current-limiting resistor. When charged, the primary capacitor 17 provides a primary signal 21 and primary current to a switched load 40, which includes a first winding 41A of a transformer 41 and a load switching device 43. The transformer 41 also has a second winding 41B connected in series with the triac 30's gate terminal 31. When the primary signal 21 reaches a satisfactory level, the load switching device 43 switches the load 40, causing current transients in the first winding 41A. The first winding current transients, in turn, induce current in the second winding 41B and in the triac gate terminal 31. The triac 30 thus becomes energized and short-circuits the current-limiting resistor 15. The second winding 41B also provides current to a diode rectifier 32 which, in turn, charges an auxiliary capacitor 18. When charged, the auxiliary capacitor provides an auxiliary signal 22 and auxiliary current. The auxiliary current in terminal 22 and the corresponding auxiliary return current in common return terminal 20 also flow through the triac gate terminal 31, thereby further energizing the triac 30.

Some advantages of a power supply arranged to limit inrush current, in accordance with the present invention, are now discussed.

To begin, the present invention provides a very simple way for solving the inrush current problem. In contrast to prior attempts to solve this problem, the present approach utilizes the minimum components needed to energize the triac 30. Note, for example, that additional transformer windings, optical coupler devices, or both, are not required by the present approach. This is because the present invention utilizes existing circuit elements to drive the gate terminal 31 and energize the triac 30. These existing circuit elements comprise the second transformer winding 41B, the auxiliary output current 22, and the auxiliary output current return 20. As a result of using these existing circuit elements to perform this triac-energizing function, a power supply arranged to limit inrush current, in accordance with the present invention, requires fewer components to implement, thus resulting in a more cost-effective solution.

Moreover, as a result of using existing circuit elements to activate the triac 30, no additional electrical isolation is required for the triac gate drive. Also, as a result of using existing circuit elements to perform this function, no additional components are required. In turn, as a result of no additional components being required, there is no additional power loss required for the triac gate drive. As a further result of no additional components being required, the power supply enjoys the benefit of reduced cost based on the absence of extra components.

Further, it is noted that the present invention results in the triac 30 operating in the right quadrant, which is the ideal quadrant for such operation.

While various embodiments of a power supply arranged to limit inrush current, in accordance with the present invention, have been described above, the scope of the present invention is defined by the following claims.

What is claimed is:

1. A power supply including a diode bridge rectifier, the diode bridge rectifier comprising a primary capacitor, a rectifier output arranged to provide direct current to the primary capacitor, a current-limiting resistor connected in series with the rectifier output and the primary capacitor, the current-limiting resistor acting to limit inrush current to the primary capacitor when the power supply is turned on, including a triac coupled in parallel with the current-limiting resistor, the triac including a gate terminal; a load with the primary capacitor providing a primary signal to the load, the load including a first winding of a transformer, the transformer having a second winding connected in series with the gate terminal.

2. The power supply of claim 1, the load including a load switching device, the load switching device arrange switch the first winding, thereby causing current transients in the first winding, which current transients cause current in the second winding and in the gate terminal to energize the triac and short-circuit the current-limiting resistor.

3. The power supply of claim 2, including a diode rectifier and an auxiliary capacitor, the second winding further arranged to provide current to the diode rectifier, the diode rectifier arranged to charge the auxiliary capacitor, the auxiliary capacitor providing an auxiliary signal.

4. The power supply of claim 3, the auxiliary signal providing an auxiliary current, the auxiliary current arranged to flow through the triac gate terminal, thus further energizing the triac.

5. The power supply of claim 4, the auxiliary current forming a corresponding auxiliary return current, the auxiliary return current arranged to flow through the triac gate terminal, thereby further energizing the triac.

6. A printing machine including a power supply, the power supply including a diode bridge rectifier, the diode bridge rectifier comprising a primary capacitor, a rectifier output arranged to provide direct current to the primary capacitor, a current-limiting resistor connected in series with the rectifier output and the primary capacitor, the current-limiting resistor acting to limit inrush current to the primary capacitor when the power supply is turned on, the power supply including a triac coupled in parallel with the current-limiting resistor, the triac including a gate terminal; a load with the primary capacitor providing a primary signal to the load, the load including a first winding of a transformer, the transformer having a second winding connected in series with the gate terminal.

7. The printing machine of claim 6, the load including a load switching device, the load switching device arranged to switch the first winding, thereby causing current transients in the first winding, which current transients cause current in the second winding and in the gate terminal to energize the triac and short-circuit the current-limiting resistor.

8. The printing machine of claim 7, including a diode rectifier and an auxiliary capacitor, the second winding further arranged to provide current to the diode rectifier, the diode rectifier arranged to charge the auxiliary capacitor, the auxiliary capacitor providing an auxiliary signal.

9. The printing machine of claim 8, the auxiliary signal providing an auxiliary current, the auxiliary current arranged to flow through the triac gate terminal, thus further energizing the triac.

10. The printing machine of claim 9, the auxiliary current forming a corresponding auxiliary return current, the auxiliary return current arranged to flow through the triac gate terminal, thereby further energizing the triac.

* * * * *